United States Patent [19]

Ravichandran et al.

[11] Patent Number: 4,666,962
[45] Date of Patent: May 19, 1987

[54] COMPOSITIONS STABILIZED WITH SUBSTITUTED AMINOXY-PROPANOATES

[75] Inventors: Ramanathan Ravichandran, Yonkers; Thomas E. Snead, Dobbs Ferry, both of N.Y.

[73] Assignee: Ciba-Geigy Corporation, Ardsley, N.Y.

[21] Appl. No.: 848,105

[22] Filed: Apr. 4, 1986

[51] Int. Cl.$^4$ .................. C07C 135/02; C08K 5/32
[52] U.S. Cl. ........................ 524/99; 524/101; 524/102; 524/239; 560/39; 560/170
[58] Field of Search ............. 524/239, 101, 99, 102; 560/39, 170

[56] References Cited

U.S. PATENT DOCUMENTS

| | | | |
|---|---|---|---|
| 3,184,500 | 5/1965 | Nicolaus et al. | 560/252 |
| 3,408,422 | 10/1968 | May | 523/508 |
| 3,432,578 | 3/1969 | Martin | 524/236 |
| 3,644,278 | 2/1972 | Klemchuk | 524/241 |
| 3,778,464 | 11/1973 | Klemchuk | 560/38 |
| 3,869,278 | 3/1975 | Wilcox | 71/103 |
| 3,926,909 | 12/1975 | Wei | 524/238 |
| 4,316,996 | 2/1982 | Collonge et al. | 568/701 |
| 4,386,224 | 5/1983 | Deetman | 568/703 |

OTHER PUBLICATIONS

Zinner: Angew. Chem. 71, (No. 9), 311, (1959).
CA 72, 78685h, (1970).

Primary Examiner—Veronica P. Hoke
Attorney, Agent, or Firm—Harry Falber

[57] ABSTRACT

Substituted aminoxy propanoate derivatives corresponding to the formula

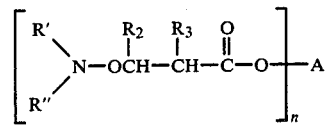

are effective in stabilizing organic materials against oxidative, thermal and actinic degradation, said derivatives being particularly effective as color improvers and process stabilizers in organic materials containing phenolic antioxidants and/or metal salts of fatty acids and/or hindered amine light stabilizers and/or organic phosphorus compounds; and certain of said derivatives as new compounds.

32 Claims, No Drawings

COMPOSITIONS STABILIZED WITH SUBSTITUTED AMINOXY-PROPANOATES

Organic polymeric materials such as plastics and resins are subject to thermal, oxidative and photo-degradation. A great variety of stabilizers are known in the art for stabilizing a diversity of substrates. Their effectiveness varies depending upon the causes of degradation and the substrate stabilized. In general, it is difficult to predict which stabilizer will be most effective and most economical for any one area of application. For example, stabilizer effectiveness in reducing volatility may depend upon preventing bond scission in the substrate molecule. Limiting embrittlement and retaining elasticity in a polymer or rubber may require prevention of excessive crosslinking and/or chain scission. Prevention of discoloration may require inhibiting reactions which yield new chromophores or color bodies in the substrate or stabilizer. Problems of process stability and incompatibility must also be considered.

Various organic hydroxylamine compounds are generally known and some are commercially available. A number of patents disclose nitrogen-substituted hydroxylamines as antioxidant stabilizers for various substrates including polyolefins, polyesters and polyurethanes. U.S. Pat. Nos. 3,432,578, 3,644,278, 3,778,464, 3,408,422, 3,926,909, 4,316,996 and 4,386,224 are representative of such patents which basically disclose N,N-dialkyl-, N,N-diaryl and N,N-diaralkyl hydroxylamine compounds and their color improvement and color stabilizing activity.

In addition, various O-acylated hydroxylamine derivatives have been disclosed. For example, U.S. Pat. No. 3,184,500 and U.S. Pat. No. 3,344,190 disclose compounds of the formula $R_2NOCH_2CH_2OAcyl$, these compounds being noted for their pharmacological utility. U.S. Pat. No. 3,869,278 discloses compounds of the formula $R_1R_2NOR_3$ wherein $R_3$ is alkylcarbonyl, these compounds being noted as fruit abscission agents.

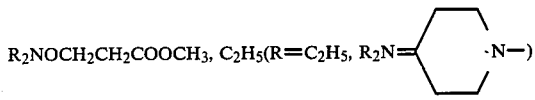

is disclosed in a pharmaceutical context in Zinner, Angew. Chem, 71 (No. 9), 311 (1959) and Pharmazie, 20, 291 (1965). Finally, certain carbonyl-substituted hydroxylamines are disclosed in Chem. Abstracts 72, 78685h (1970) for a pharmaceutical utility.

It has now been determined that the compositions of this invention exhibit a variety of desirable properties stemming from the presence therein of the indicated substituted aminoxy propanoates. Thus, the compounds serve to protect various substrates such as polyolefins, elastomers and lubricating oils against the adverse effects of oxidative and thermal degradation. They are most effective as color improvers and process stabilizers in polyolefin compositions which may contain metal salts of fatty acids and which also contain a phenolic antioxidant. Thus, they serve to substantially reduce color formation resulting from the presence of the phenolic antioxidant and/or from the processing conditions as well as to directly protect the polymer from said processing conditions. They also prevent the discoloration of polyolefin compositions containing hindered amine light stabilizers or combinations of phenolic antioxidants and organic phosphites. In addition, the gas fading that may be experienced upon exposure to the combustion products of natural gas is also significantly reduced.

It is a primary object of this invention to provide compositions of organic materials stabilized against oxidative, thermal and actinic degradation by the presence therein of a class of substituted aminoxy propanoate derivatives.

It is a further object to provide such compositions which also contain phenolic antioxidants wherein said propanoates substantially reduce color formation resulting from the presence of said phenol.

It is still a further object to provide a class of propanoate derivatives which exhibits a broad range of improved stabilization performance characteristics.

Various other objects and advantages of this invention will become evident from the following description thereof.

The stabilizing compounds utilized in the compositions of this invention correspond to the formula

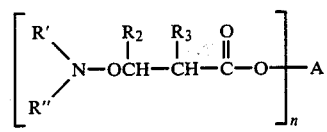

wherein n is 1 to 4;

R' and R" are independently hydrogen, alkyl of 1 to 36 carbon atoms, allyl, cycloalkyl of 5 to 12 carbon atoms, aralkyl of 7 to 9 carbon atoms or said aralkyl substituted by alkyl of 1 to 36 carbon atoms, $R_2$ and $R_3$ are independently hydrogen, alkyl of 1 to 12 carbon atoms or aryl;

A, when n=1, is hydrogen, an alkali metal, alkyl of 1 to 36 carbon atoms, alkoxyalkyl of 2 to 6 carbon atoms, cycloalkyl of 5 to 12 carbon atoms, aralkyl of 7 to 9 carbon atoms, said aralkyl substituted by alkyl of 1 to 36 carbon atoms, aryloxyalkyl($C_2$-$C_6$) or a heterocyclic radical with 5 to 7 ring members;

A, when n=2, is an alkaline-earth metal, alkylene of 2 to 12 carbon atoms, cycloalkylene of 6 to 10 carbon atoms, arylene of 6 to 10 carbon atoms, or

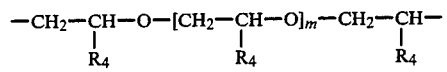

wherein m is 1 or 2 and $R_4$ is hydrogen or methyl, or

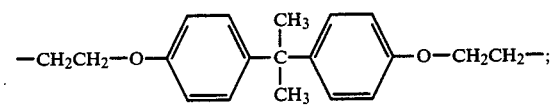

A, when n=3, is alkanetriyl of 3 to 12 carbon atoms, or said alkanetriyl of 3 to 12 carbon atoms interrupted by one or more oxygen atoms; and A, when n=4, is alkanetetrayl of 4 to 6 carbon atoms.

The R' and R" groups are preferably hydrogen, straight-chain or branched alkyl with 1 to 18 carbon atoms such as methyl, ethyl, n-propyl, n-butyl, tert-butyl, n-pentyl, n-octyl, 2-ethylhexyl, decyl, dodecyl and octadecyl; cyclopentyl and cyclohexyl; and benzyl, α-methylbenzyl and α,α-dimethylbenzyl. $R_2$ and $R_3$ are preferably hydrogen, alkyl of 1 to 4 carbon atoms or phenyl.

Other preferred groups include, for n=1, A as $C_1$–$C_{18}$ alkyl (see preferred list for R' and R") and hydrogen to prepare the acid; for n=2, A as alkylene of 2 to 6 carbon atoms, e.g. ethylene, propylene or hexylene, cyclohexylene phenylene, xylylene and one of the indicated ethers; for n=3, A as glyceryl and trimethylylpropane; and for n=4, A as pentaerythrityl. In addition, alkoxyalkyl includes ethoxymethyl; heterocyclic includes 4-piperidyl and tetrahydrofuryl; the oxygen-interrupted alkanetriyl includes groups such as

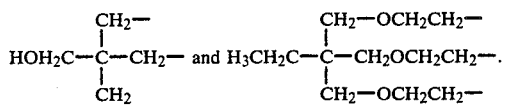

The derivatives of this invention can be prepared by reacting the appropriately substituted hydroxylamine with an appropriately substituted acrylate, methacrylate or crotonate in a solvent to yield the desired product. Typical acrylate reactants include methyl acrylate, methyl methacrylate, ethyl acrylate, butyl acrylate, octyl acrylate, octadecyl acrylate and 1,6-hexanedioldiacrylate. The solvent can be an aromatic hydrocarbon such as benzene, toluene, xylene, and the like, or a heterocyclic ether, such as tetrahydrofuran or a lower alcohol such as ethanol. The reaction temperature ranges from 25° to 150° C. The preferred method for preparing these compounds involves reacting the hydroxylamine with the acrylate in the presence of an alkali hydroxide or an alkali alkoxide. The starting materials needed to prepare the stabilizers of this invention are items of commerce or can be prepared by known methods.

The corresponding acids can be prepared by saponification of the ester by known methods.

An alternate approach for the multi-substituted compounds involves reacting the appropriately substituted 3-(N,N-di-substituted-aminoxy) propanoic acid with a chloride such as oxalyl chloride or thionyl chloride to prepare the corresponding acid chloride and then reacting the acid chloride with an appropriate polyol. Typical polyols include ethylene glycol, hexanediol, trimethylolpropane, glycerol, neopentylglycol and pentaerythritol.

The compounds of the present invention are particularly effective in stabilizing organic materials subject to oxidative, thermal and actinic degradation, such as plastics, polymers and resins.

Substrates in which these compounds are particularly useful are polyolefins such as polyethylene and polypropylene; polystyrene, including impact polystyrene, ABS resin, SBR, isoprene, as well as natural rubber, polyesters including polyethylene terephthalate and polybutylene terephthalate, including copolymers, and lubricating oils such as those derived from mineral oil.

In general polymers which can be stabilized include

1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under (1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under (5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, epichlorohydrine homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.

8. Polymers which are derived from α,β-unsaturated acids and derivatives thereof, such as polyacrylates and polymethacrylates, polyacrylamide and polyacrylonitrile.

9. Copolymers from the monomers mentioned under (8) with each other or with other unsaturated monomers, such as, for instance, acrylonitrile/butadien, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallyl-melamine.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadienes with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamid or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane] terephthalate and polyhydroxybenzoates as well as block-copolyether-esters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatine and derivatives thereof which are chemically modified in a polymerhomologous manner, such as cellulose acetates, cellulose propionates and cellulose butyrates, or the cellulose ethers, such as methylcellulose.

27. Mixtures of polymers as mentioned above, for example PP/EPDM, Polyamide 6/EPDM or ABS, PVC/EVA, PVC/ABS, PVC/MBS, PC/ABS, PBTP/ABS.

28. Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellithates) and also mixtures of synthetic esters with mineral oils in ay weight ratios, which materials may be used as plasticizer for polymers or as textile spinning oils, as well as aqueous emulsions of such materials.

29. Aqueous emulsions of natural or synthetic rubber, e.g. natural latex or latices of carboxylated styrene/-butadiene copolymers.

In general, the compounds of the present invention are employed in from about 0.01 to about 5% by weight of the stabilized composition, although this will vary with the particular substrate and application. An advantageous range is from about 0.5 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. Antioxidants 1.1. Alkylated monophenols, for example,
2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-($\alpha$-methylcyclohexyl)-4,6-dimethylphenol
2,6-di-octadecyl-4-methylphenol
2,4,6-tri-cyclohexylphenol
2,6-di-tert.butyl-4-methoxymethylphenol 1.2. Alkylated hydroquinones, for example,
2,6-di-tert.butyl-4-methoxyphenol
2,5-di-tert.butyl-hydroquinone
2,5-di-tert.amyl-hydroquinone
2,6-diphenyl-4-octadecyloxyphenol 1.3. Hydroxylated thiodiphenyl ethers, for example
2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)

1.4. Alkyliden-bisphenols, for example,
2,2'-methylene-bis-(6-tert.butyl-4-methylphenol)
2,2'-methylene-bis-(6-tert.butyl-4-ethylphenol)
2,2'-methylene-bis-[4-methyl-6-($\alpha$-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-($\alpha$-methylbenzyl)-4-nonylphenol]
2,2'-methylene-bis-[6-($\alpha,\alpha$-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
2,2'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane ethylenglycol-bis-[3,3-bis-(3'-tert.butyl-4'-hydroxy-phenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.-butyl-4-methylphenyl]-terephthalate.

1.5. Benzyl compounds, for example,
1,3,5-tri-(3,5-di-tert.butyl-4-hydroxybenzyl)-2,4,6-trimethylbenzene-di-(3,5-di-tert.butyl-4-hydroxybenzyl)-sulfide
3,5-di-tert.butyl-4-hydroxybenzyl-mercapto-acetic acid isooctyl ester
bis-(4-tert.butyl-3-hydroxy-2,6-dimethylbenzyl)dithiol-terephthalate
1,3,5-tris-(3,5-di-tert.butyl-4-hydroxybenzyl)-isocyanurate
1,3,5-tris-(4-tert.butyl-3-hydroxy-2,6-dimethylbenzyl)-isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt 1.6. Acylaminophenols, for example,
4-hydroxy-lauric acid anilide
4-hydroxy-stearic acid anilide
2,4-bis-octylmercapto-6-(3,5-tert.butyl-4-hydroxyanilino)-s-triazine
octyl-N-(3,5-di-tert.butyl-4-hydroxyphenyl)-carbaminate 1.7. Esters of β-(3,5-di-tert.butyl-4-hydroxyphenyl)-propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.8. Esters of β-(5-tert.butyl-4-hydroxy-3-methyl-phenyl)-propionic acid with monohydric or polyhydric alcohols, for example,

| | |
|---|---|
| methanol | diethyleneglycol |
| octadecanol | triethyleneglycol |
| 1,6-hexanediol | pentaerythritol |
| neopentylglycol | tris-hydroxyethyl isocyanurate |
| thiodiethyleneglycol | di-hydroxyethyl oxalic acid diamide |

1.9. Amides of β-(3,5-di-tert.butyl-4-hydroxyphenyl)-propionic acid for example,
N,N'-di-(3,5-di-tert.butyl-4-hydroxyphenylpropionyl)-hexamethylendiamine
N,N'-di-(3,5-di-tert.butyl-4-hydroxyphenylpropionyl)-trimethylendiamine
N,N'-di-(3,5-di-tert.butyl-4-hydroxyphenylpropionyl)-hydrazine 2. UV absorbers and light stabilisers 2.1. 2-(2'-Hydroxyphenyl)-benztriazoles, for example, the 5'-methyl-, 3',5'-di-tert.butyl-, 5'-tert.butyl-, 5'-(1,1,3,3-tetramethylbutyl)-, 5-chloro-3',5'-di-tert.-butyl-, 5-chloro-3'-tert.butyl-5'-methyl-, 3'-sec.butyl-5'-tert.butyl-, 4'-octoxy, 3',5'-di-tert.amyl-, 3',5'-bis-(α,α-dimethylbenzyl)-derivative.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivative.

2.3. Ester of optionally substituted benzoic acids for example, phenyl salicylate, 4-tert.butyl-phenylsalicilate, octylphenyl salicylate, dibenzoylresorcinol, bis-(4-tert.-butylbenzoyl)-resorcinol, benzoylresorcinol, 3,5-di-tert.-butyl-4-hydroxybenzoic acid 2,4-di-tert.butyl-phenyl ester and 3,5-di-tert.-butyl-4-hydroxybenzoic acid hexadecyl ester.

2.4. Acrylates, for example, α-cyano-β,β-diphenyla-crylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyano-vinyl)-2-methyl-indoline.

2.5 Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.butylben-zylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate bis-(1,2,2,6,6-pentamethylpiperidyl)-sebacate n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetra-carbonic acid, 1,1'(1,2-ethanediyl)-bis-(3,3,5,5-tetramethylpiperazinone).

2.7. Oxalic acid diamides, for example, 4,4'-di-octyloxy-oxanilide, 2,2'-di-octyloxy-5,5'-di-tert.butyl-oxanilide, 2,2'-di-dodecyloxy-5,5'-di-tert.butyl-oxanilide, 2-ethoxy-2'-ethyl-oxanilide, N,N'-bis (3-dimethylaminopropyl)-oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy-as well as of o- and p-ethoxy-disubstituted oxanilides.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzyliden-oxalic acid dihydrazide.

4. Phosphites and phosphonites, for example, triphenyl phosphite, diphenylalkyl phosphites, phenyldialkyl phosphites, tri-(nonylphenyl)phosphite, trilauryl phosphite, trioctadecyl phosphite, di-stearyl-pentaerythritol diphosphite, tris-(2,4-di-tert.butylphenyl) phosphite, di-isodecylpentaerythritol diphosphite, di-(2,4-di-tert.-butylphenyl)pentaerythritol diphosphite, tristearyl-sorbitol triphosphite, tetrakis-(2,4-di-tert.butyl-phenyl)-4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc-dibutyl-dithiocaramate, dioctadecyldisulfide, pentaerythritol-tetrakis-(β-dodecylmercapto)-propionate.

6. Polyamide stabilisers, for example copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents, for example, 4-tert.butyl-benzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxides, carbon black, graphite.

10. Other additives, for example, plasticizers, lubricants, emulsifiers, pigments, optical brighteners, flameproofing agents, anti-static agents, blowing agents and thiosynergists such as dilaurylthiodipropionate or distearylthiodipropionate.

While the instant aminoxy propanoates can be beneficially used as stablizers for a variety of substrates, particularly the polyolefins, both alone and in conjunction with other coadditives, the introduction of the instant aminoxy propanoates into polyolefins, optionally containing various alkali metal, alkaline earth metal and aluminum salts of higher fatty acids (see Additive #7 hereinabove), with hindered phenolic antioxidants exhibits enhanced and particularly salubrious protection to such substrates in terms of reducing color formation stemming from the presence of the phenols. Such phenolic antioxidants include n-octadecyl 3,5-di-tert-butyl-4-hydroxyhydrocinnamate, neopentanetetrayl tetrakis-(3,5-di-tert-butyl-4-hydroxyl-hydrocinnamate), di-n-octadecyl 3,5-di-tert-butyl-4-hydroxybenzyl-phosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris (3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris-(2,6-di-methyl-4-tert-butyl-3-hydroxybenzyl)isocyanurate, 1,1,3-tris-(2-methyl-4-hydroxy-5-tert-butylphenyl)butane, 1,3,5-tris-[2-(3,5-di-tert-butyl-4-hydroxyhydrocinnamoyloxy)-ethyl]-isocyanurate, 3,5-di-(3,5-di-tert-butyl-4-hydroxybenzyl)-mesitol, hexa-methylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydro-cinnamamide), calcium bis(ethyl-3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis-[2-(3,5-tert-butyl-4-hydroxyhydroxocinnamoyloxy)-ethyl]-oxamide, and preferably neopentanetetrayl tetrakis( 3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxy-benzyl)benzene, 1,3,5-tris-(3,5-di-tert-butyl-4-hydroxy-benzyl)isocyanurate, 2,6-di-tert-butyl-p-cresol or 2,2'-ethylidene-bis(4,6-di-tert-butylphenol).

Likewise, the instant compounds prevent color formation when hindered amine light stabilizers are present, such hindered amines including bis(1,2,2,6,6-pentamethyl-4-piperidyl)-2-n-butyl-2-(3,5-di-tert-butyl-4-hydroxy-benzyl) malonate; bis(2,2,6,6-tetramethyl-4-piperidyl) sebacate; dimethylsuccinate polymer with 4-hydroxy-2,2,6,6-tetramethyl-1-piperidinethanol; and polymer of 2,4-dichloro-6-octylamino-s-triazine with N'-(2,2,6,6-tetramethyl-4-piperidyl)hexamethylene diamine.

As previously noted, certain aminoxy propanoate derivatives also form part of the instant invention. These derivatives correspond to the above noted generic formula wherein all the defined substituents are identical except for the n value (identified as p for these compounds) which is 2–4. The preferred substituents, preparative procedures and utility statements noted hereinabove equally apply to these novel propanoate derivatives.

The following examples illustrate the embodiments of this invention. Thus, they describe the preparation of various propanoates, including those forming part of the invention, and of stabilized compositions. In these examples, all parts given are by weight unless otherwise specified.

EXAMPLE I

Methyl-3-[N,N-dibenzylaminoxy]propanoate

A solution of 42.6 g of N,N-dibenzylhydroxylamine, 25.8 g of methyl acrylate and 2.0 g of potassium-tert-butoxide in 200 ml of tetrahydrofuran is heated under reflux for 12 hours under $N_2$. The crude reaction mixture is concentrated under reduced pressure and the residue is partitioned between water and ether. The orcanic layer is washed with water, saturated $NaHSO_4$ solution and brine, dried ($MgSO_4$) and then evaporated under reduced pressure to give the title compound as an oil.

Anal. calcd. for $C_{18}H_{21}NO_3$: C, 72.2; H, 7.1; N, 4.7. Found: C, 72.2; H, 7.1; N, 4.7.

EXAMPLE II

Ethyl-3-[N,N-dibenzylaminoxy]propanoate

The procedure of Example I is repeated using 21.33 g of N,N-dibenzylhydroxylamine, 10.33 g of methyl acrylate and 1.0 g of potassium-tert-butoxide in 100 ml of ethanol, to afford the title compound as a colorless liquid.

Anal. calcd. for $C_{19}H_{23}NO_3$: C, 72.8; H, 7.4; N, 4.5. Found: C, 72.4; H, 7.5; N, 4.4.

EXAMPLE III 1,6-Hexamethylene-bis[3-(N,N-dibenzylaminoxy)-propanoate]

The procedure of Example I is repeated using 21.33 g of N,N-dibenzylhydroxylamine, 11.30 g of 1,6-hexanedioldiacrylate and 1.16 g of potassium-tert-butoxide in 150 ml of tetrahydrofuran, to afford the title compound as a colorless liquid.

Anal. calcd. for $C_{40}H_{48}N_2O_6$: C, 73.6; H, 7.4; N, 4.3. Found: C, 73.8; H, 7.7; N, 4.4.

EXAMPLE IV

Methyl-[2-(methyl)-3-(N,N-dibenzylaminoxy)]-propanoate

The procedure of Example I is repeated using 10.66 g of N,N-dibenzylhydroxylamine, 7.5 g of methyl methacrylate, and 0.50 g of potassium-tert-butoxide in 150 ml of tetrahydrofuran, to afford the title compound as a pale yellow liquid.

Anal. calcd. for $C_{19}H_{23}NO_3$: C, 72.8; H, 7.4; N, 4.5. Found: C, 72.8; H, 7.4; N, 4.4.

EXAMPLE V

Octadecyl-3-[N,N-dibenzylaminoxy]propanoate

The procedure of Example I is repeated using 10.66 g of N,N-dibenzylhydroxylamine, 16.03 g of n-octadecyl acrylate, and 0.50 g of potassium-tert-butoxide in 100 ml of tetrahydrofuran, to afford the title compound as a colorless oil.

Anal. calcd. for $C_{35}H_{55}NO_3$: C, 78.2; H, 10.3; N, 2.6. Found: C, 78.0; H, 10.2; N, 2.6.

EXAMPLE VI

3-[N,N-dibenzylaminoxy]propanoic acid

A solution of 22.4 g of methyl 3-[N,N-dibenzylaminoxy]propanoate and 4.50 g of potassium hydroxide in 200 ml of tetrahydrofuran and 200 ml of water is heated under reflux for 12 hours under $N_2$. The mixture is concentrated under reduced pressure and the residue is partitioned between water and ether. The combined aqueous extracts are acidified with hydrochloric acid and then extracted with methylene chloride. The combined organic extracts are dried ($MgSO_4$) and evaporated under reduced pressure to afford the title compound as a pale yellow oil.

Anal. calcd. for $C_{17}H_{19}NO_3.0.5H_2O$: C, 69.3; H, 7.1; N, 4.8. Found: C, 69.4; H, 6.9; N, 4.7.

EXAMPLE VII

Tetrakis[(N,N-dibenzylaminoxy)ethylcarbonyloxymethyl]methane

A solution of 11.8 g of the compound of Example VI in 25 ml of methylene chloride is admixed with 3.2 ml of oxalyl chloride at 0°-5° C. After 2 hours, 1.10 g of pentaerythritol is added and the reaction is stirred at room temperature for 12 hours. The reaction mixture is diluted with approximately 120 ml of methylene chloride and washed with 1N NaOH solution, brine, dried ($MgSO_4$) and evaporated to give a yellow oil. Purification by liquid chromatography affords the title compound as a colorless oil.

Anal. calcd. for $C_{73}H_{80}N_4O_{12}$: C, 72.7; H, 6.7; N, 4.7. Found: C, 72.5; H, 6.6; N, 5.0.

EXAMPLE VIII

Octadecyl-3-[N,N-diethylaminoxy]propanoate

The procedure of Example I is repeated using 4.46 g of N,N-diethylhydroxylamine, 16.03 g of n-octadecylacrylate and 0.56 g of potassium-tert-butoxide in 100 ml of tetrahydrofuran, to afford the title compound as a colorless liquid.

Anal. calcd. for $C_{25}H_{51}NO_3$: C, 72.6; H, 12.4; N, 3.4. Found: C, 72.7; H, 12.1; N, 3.3.

EXAMPLE IX

3-[N,N-Dibenzylaminoxy]-propanoic acid potassium salt

To a stirred solution of 9.75 g of the compound of Example I in 100 ml of toluene is added 3.85 g of potassium trimethylsilanolate. After stirring the mixture at room temperature for 12 hours, the mixture is concentrated under reduced pressure and the residue is triturated with ether to leave the title compound as an off-white hygroscopic solid.

EXAMPLE X 1,6-Hexamethylene bis[3-(N-allyl-N-dodecylaminoxy) propanoate]

The procedure of Example I is repeated using 7.24 g of N-allyl-N-dodecylhydroxylamine, 3.39 g of 1,6-hexanedioldiacrylate and 0.67 g of potassium tert-butoxide in tetrahydrofuran, to give the title compound as a low melting semi-solid.

Anal. calcd. for $C_{42}H_{80}N_2O_6$: C, 71.1; H, 11.4; N, 4.0. Found: C, 71.0; H, 11.2; N, 3.8.

EXAMPLE XI

6-[N,N-Dibenzylaminoxyethylcarbonyloxy]hexylacrylate

The title compound is isolated as a by product during the preparation of Example III.

Anal. Calcd. for $C_{26}H_{33}NO_5$: C, 71.1; H, 7.6; N, 3.2. Found: C, 71.9; H, 7.4; N, 3.4.

EXAMPLE XII

Processing of Polypropylene

| Base Formulation | |
| --- | --- |
| Polypropylene* | 100 parts |
| Calcium Stearate | 0.10 part |

*Profax 6501 from Himont USA

The indicated stabilizers are solvent blended into polypropylene as solutions in methylene chloride and after removal of solvent by evaporation at reduced pressure, the resin is extruded using the following extruder conditions:

| | Temperature (°C.) |
| --- | --- |
| Cylinder #1 | 232 |
| Cylinder #2 | 246 |
| Cylinder #3 | 260 |
| Gate #1 | 260 |
| Gate #2 | 260 |
| Gate #3 | 260 |
| RPM 100 | |

During extrusion, the internal extruder pressure is determined using a pressure transducer. After each of the first, third and fifth extrusions, resin pellets are compression molded into 125 mil (3.2mm) thick plaques at 193° C. and specimen yellowness index (Y.I.) determined according to ASTM D1925-63T.

The melt flow rate (MFR) is determined by ASTM method 1238 condition L. The melt flow rate varies inversely as the transducer pressure and both are a measure of the molecular weight for a specific type of polymer. The results of several different experimental series are shown in the following table.

| Series 1 | | | |
|---|---|---|---|
| | Extrusion Temperature 260° C. | | |
| | YI Color After Extrusion | | |
| Additives | 1 | 3 | 5 |
| Base Resin | 4.6 | 4.3 | 4.4 |
| 0.1% Antioxidant A | 6.3 | 8.8 | 10.0 |
| 0.1% Antioxidant A + 0.05% Ex. II | 4.2 | 3.0 | 4.8 |

| Series 2 | | | |
|---|---|---|---|
| | Extrusion Temperature 260° C. | | |
| | YI Color After Extrusion | | |
| | 1 | 3 | 5 |
| Base Resin | −3.5 | −3.4 | −2.7 |
| 0.1% Antioxidant A | −1.1 | 1.4 | 3.8 |
| 0.1% Antioxidant A + 0.05% Ex. III | −4.5 | −4.0 | −2.9 |
| 0.1% Antioxidant A + 0.05% Ex. IV | −3.9 | −5.3 | −2.9 |

| Series 3 | | | |
|---|---|---|---|
| | Extrusion Temperature 260° C. | | |
| | YI Color After Extrusion | | |
| | 1 | 3 | 5 |
| Base Resin | 2.5 | 3.5 | 4.7 |
| 0.1% Antioxidant A | 7.4 | 13.7 | 15.9 |
| 0.1% Antioxidant A + 0.05% Ex. VII | 2.3 | 2.4 | 2.4 |

| | MFR After Extrusion (g/10 min) | |
|---|---|---|
| | 1 | 5 |
| Base Resin | 6.3 | 14.9 |
| 0.1% Antioxidant A | 3.4 | 6.9 |
| 0.1% Antioxidant A + 0.05% Ex. VII | 3.5 | 4.6 |

| Series 4 | | | | | |
|---|---|---|---|---|---|
| | Extrusion Temperature (260° C.) | | | | |
| | YI Color After Extrusion | | | MFR (g/10 min) After Extrusion | |
| | 1 | 3 | 5 | 1 | 5 |
| Base Resin | 1.6 | 1.1 | 1.3 | 1.3 | 12.5 |
| 0.1% Antioxidant A | 6.0 | 11.7 | 14.6 | 4.0 | 5.9 |
| 0.1% Antioxidant A + 0.05% Ex V | 1.1 | 1.2 | 2.1 | 2.6 | 4.2 |
| 0.1% Antioxidant A + 0.05% Ex VIII | 1.0 | 3.0 | 6.6 | 2.5 | 4.2 |

| Series 5 | | | | | |
|---|---|---|---|---|---|
| | Extrusion Temperature (260° C.) | | | | |
| | YI Color After Extrusion | | | MFR (g/10 min) After Extrusion | |
| | 1 | 3 | 5 | 1 | 5 |
| Base Resin | 4.5 | 4.6 | 5.2 | 9.5 | 39 |
| 0.1% Antioxidant B | 6.1 | 8.7 | 11 | 4.2 | 8.9 |
| 0.05% Antioxidant B + 0.05% of Ex I | 4.5 | 5.0 | 6.4 | 4.5 | 8.2 |

Antioxidant A - Neopentyl tetrakis [3-(3′,5′-di-tert-butyl-4′-hydroxyphenyl)-propanoate]
Antioxidant B - 1:1 weight blend of Antioxidant A and tris-(2,4-di-tert-butylphenyl)-phosphite

EXAMPLE XIII

Resistance to Gas Fading of Polypropylene Fibers

The base formulation comprises 100 parts of unstabilized polypropylene (Profax 6501, Hercules) with 0.10 parts of calcium stearate. Various test stabilizers are solvent blended into the polypropylene and extruded (one extrusion) as described in Example XII and pelletized.

The stabilized resin pellets obtained are spun into fibers at 260° C. and a visual color rating number is assigned before exposure to gas fading at 60° C. and after 2, 6, 24 and 48 hours of exposure. Lower numbers indicate less yellowing and less color. The gas fading procedure is carried out in an AATCC gas fume chamber (Drum Model No. 8727) according to the standard procedure of AATCC Test Method 23, Colorfastness to Burnt Gas Fumes.

The results are given below.

| Discoloration Resistance of Stabilized Polypropylene Fibers to Gas Fading | | | | | | |
|---|---|---|---|---|---|---|
| | | Visual Color Rating After Hours Exposure To Gas Fading at 60° C. | | | | |
| Stabilizer* | Conc. Stabilizer % by wt. | 0 | 2 | 6 | 24 | 48 |
| Base formulation plus | — | 0 | 2 | 4 | 5 | 5 |
| Antioxidant A | 0.25 | | | | | |
| Light stabilizer (a) | 0.25 | | | | | |
| Phosphorus 1 | 0.25 | | | | | |
| plus compound | | | | | | |
| of Example I | 0.25 | 0 | 0 | 0 | 3 | 5 |
| of Example III | 0.50 | 0 | 0 | 0 | 3 | 5 |

*Light stabilizer (a) = polycondensation product of 2,4-di-chloro-6-tert-octyl-amino-s-triazine and 4,4′-hexamethylenebis(amino-2,2,6,6-tetramethylpiperidine)
Phosphorus 1 = tris(2,4-di-tert-butylphenyl)phosphite It is thus seen that the instant compounds prevent the discoloration of polypropylene fibers, having various other stabilizers present, in respect to gas fading. These include polypropylene containing a hindered amine light stabilizer in combination with a phenolic antioxidant and an organic phosphite.

EXAMPLE XIV

Light Stabilization of Polypropylene

Unstabilized polypropylene powder (Hercules Profax 6501) is thoroughly blended with the indicated amount of additive. The blended materials are then milled on a two-roll mill at 182° C. for 5 minutes, after which time the stabilized polypropylene is sheeted from the mill and allowed to cool. The milled polypropylene is then cut into pieces and compression molded on a hydraulic press at 250° C. and 175 psi (1.2×10$^6$ Pa) into 25 mil plaques. The sample is exposed in a fluorescent sunlight/black light chamber until failure. Failure is taken as the hours required to reach 0.5 carbonyl absorbance by infrared spectroscopy on the exposed films.

| Additive | Additive Conc. (% by Weight) | Hours to Failure |
|---|---|---|
| None | — | 100 |
| Example II | 0.3 | 450 |
| Example III | 0.3 | 422 |
| Example V | 0.2 | 300 |
| Example VIII | 0.2 | 310 |

These data thus indicate the effective stabilization activity of the instant compounds.

EXAMPLE XV

Inhibition of Oxidation of Petroleum Turbine Oil

This test is performed according to ASTM procedure D943-81. 300 ml of 150N paraffinic mineral oil containing 0.25% by weight of the test compound and 60 ml of distilled water are charged into a large glass tube and heated in an oil bath maintained at 95° C. Oxygen is bubbled at a rate of 3 liters per hour through the delivery tube and through the oil-water mixture. Iron-copper catalyst coils are mounted in the oxygen delivery tube. Samples of oil are removed periodically and the acid number determined. The oil under test is considered to have failed when an acid number of 2.0 has been attained. The test data are given below.

| Additive | Time (Hrs) | Acid Number |
|---|---|---|
| Base Oil (No stabilizer) | 90–100 | 2.0 |
| Compound of Example II | 340 | 2.0 |
| Compound of Example VIII | 125 | 2.0 |

The instant compounds are seen to stabilize the oil for a period in excess of the oxidation lifetime of the base oil.

EXAMPLE XVI

Engine Oil Thin Film Oxygen Uptake Test

This is conducted in the standard rotary bomb apparatus (described in ASTM D-2272) with modifications in procedure as described in the Preprint No. 82 CC-10-1 presented at the Conference of the American Society of Lubrication Engineers, Oct. 5-7, 1982.

A 1.5 gram test sample of 150N paraffinic mineral oil containing enough zinc dialkyldithiophosphate (ZDTP) to give 0.1% by weight of zinc and 0.5% by weight of the test compound is placed in the test apparatus. A catalyst package comprising 0.075 grams of oxidized fuel components, 0.075 grams of soluble metal catalyst* and 0.030 grams of water are added. The temperature is set at 160° C. and the initial oxygen pressure is 90 psi. Failure is taken as the time in minutes for a pressure drop of 25 psi to be observed. The test results are given below.
*The soluble metal catalysts are a mixture of the following metal naphthenates in the weight ratios given below: cupric 0.69%, ferric 0.41%, lead 8.0%, manganese 0.35%, stannous 0.36% (as naphthenates).

| Test compound of Example | Failure Time (min.) |
|---|---|
| Base oil (no stabilizer) | 105 |
| Compound of Example II | 118 |
| Compound of Example VIII | 137 |

EXAMPLE XVII

Process Stability in Elastomers

Antioxidants are evaluated in a medium cis-polybutadiene cement (Firestone Diene 55). After incorporation of stabilizers as cyclohexane solutions, the rubber is isolated by steam coagulation and the crumb is washed with water and dried under vacuum at 40° C. Samples for oven aging (70° C., circulating air oven) are prepared by pressing plaques (130 mils) at 100° C. for 3 minutes. Mooney viscosities of the aged and unaged specimens are determined according to ASTM D-1646, part 37. High temperature aging is carried out in a Brabender Plasticorder at 160° C. (60 RPM). The induction time to crosslinking (minutes to an increase in torque) is determined. The results are shown in the following table.

| | | 70° C. oven aging (weeks) | | | | | | | 160° C. |
|---|---|---|---|---|---|---|---|---|---|
| | | Mooney Viscosity | | | | Gardner color | | | $T_{Ind.}$ |
| Additives | Conc (%) | 0 | 4 | 8 | 12 | 0 | 4 | 8 | 12 | (Min) |
| — | — | 56 | 74 | — | — | 1 | — | — | 8 | 1.5 |
| Compound of Ex. III | 0.25 | 51 | 63 | — | — | 2 | 3 | 8 | 8 | >30 |

Based on the above data ($T_{Ind.}$), it is seen that the compound of Ex. III provides meaningful stabilization of the elastomer.

Summarizing, it is seen that this invention provides organic materials stabilized against degradation by the presence therein of various aminoxy propanoates as well as certain of said aminoxy propanoates. Variations may be made in proportions, procedures and materials without departing from the scope of the invention as defined by the following claims.

What is claimed is:

1. A composition of matter comprising an organic material subject to oxidative, thermal and actinic degradation stabilized with an effective stabilizing amount of a compound of the formula

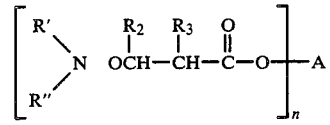

wherein
n is 1 to 4;
R' and R'' are independently hydrogen, alkyl of 1 to 36 carbon atoms, allyl, cycloalkyl of 5 to 12 carbon atoms, aralkyl of 7 to 9 carbon atoms or said aralkyl substituted by alkyl of 1 to 36 carbon atoms,
$R_2$ and $R_3$ are independently hydrogen, alkyl of 1 to 12 carbon atoms or aryl;
A, when n=1, is hydrogen, an alkali metal, alkyl of 1 to 36 carbon atoms, alkoxyalkyl of 2 to 6 carbon atoms, cycloalkyl of 5 to 12 carbon atoms, aralkyl of 7 to 9 carbon atoms, said aralkyl substituted by alkyl of 1 to 36 carbon atoms, aryloxyalkyl($C_2$–$C_6$) or a heterocyclic radical with 5 to 7 ring members;
A, when n=2, is an alkaline-earth metal, alkylene of 2 to 12 carbon atoms, cycloalkylene of 6 to 10 carbon atoms, arylene of 6 to 10 carbon atoms,

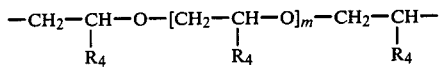

wherein m is 1 or 2 and $R_4$ is hydrogen or methyl, or

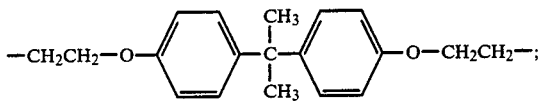

A, when n=3, is alkanetriyl of 3 to 12 carbon atoms, or said alkanetriyl of 3 to 12 carbon atoms interrupted by one or more oxygen atoms; and A, when n=4, is alkanetetrayl of 4 to 6 carbon atoms.

2. The composition of claim 1, wherein R' and R" are independently hydrogen, straight-chain or branched alkyl with 1 to 18 carbon atoms, cyclopentyl, cyclohexyl, benzyl, α-methylbenzyl or α,α-dimethylbenzyl and $R_2$ and $R_3$ are independently hydrogen or alkyl of 1 to 4 carbon atoms.

3. The composition of claim 2, wherein R' and R" are benzyl and $R_2$ and $R_3$ are hydrogen.

4. The composition of claim 1, wherein n is 1 and A is $C_1$-$C_{18}$ alkyl.

5. The composition of claim 1, wherein n is 1 and A is hydrogen.

6. The composition of claim 1, wherein n is 2 and A is $C_2$-$C_6$ alkylene, cyclohexylene, phenylene or xylylene.

7. The composition of claim 1, wherein n is 3 and A is glyceryl or trimethylylpropane.

8. The composition of claim 1, wherein n is 4 and A is pentaerythrityl.

9. The composition of claim 4, wherein said compound is methyl-3-[N,N-dibenzylaminoxy]propanoate.

10. The composition of claim 4, wherein said compound is ethyl-3-[N,N-dibenzylaminoxy]propanoate.

11. The composition of claim 6, wherein said compound is 1,6-hexamethylene bis-[3-(N,N-dibenzylaminoxy) propanoate].

12. The composition of claim 4, wherein said compound is methyl-[2-(methyl)-3-(N,N-dibenzylaminoxy)]propanoate.

13. The composition of claim 4, wherein said compound is octadecyl-3-[N,N-dibenzylaminoxy]propanoate.

14. The composition of claim 8, wherein said compound is tetrakis[(N,N-dibenzylaminoxy)ethylcarbonyloxymethyl]methane.

15. The composition of claim 4, wherein said compound is octadecyl-3-[N,N-diethylaminoxy]propanoate.

16. The composition of claim 1, wherein the organic material is a synthetic polymer.

17. The composition of claim 16, wherein said synthetic polymer is a polyolefin homopolymer or copolymer.

18. The composition of claim 17 which also contains a metal salt of a higher fatty acid.

19. The composition of claim 1 which also contains a phenolic antioxidant.

20. The composition of claim 18 which also contains a phenolic antioxidant.

21. The composition of claim 19, wherein said phenolic antioxidant is selected from the group consisting of n-octadecyl 3,5-di-tert-butyl-4-hydroxyhydrocinnamate, neopentanetetrayl tetrakis-(3,5-di-tert-butyl-4-hydroxylhydrocinnamate), di-n-octadecyl 3,5-di-tert-butyl-4-hydroxybenzyl-phosphonate, 1,3,5-tris(3,5-di-tert-butyl-4-hydroxy-benzyl)isocyanurate, thiodiethylene bis(3,5-di-tert-butyl-4-hydroxyhydrocinnamate), 1,3,5-trimethyl-2,4,6-tris (3,5-di-tert-butyl-4-hydroxybenzyl)benzene, 3,6-di-oxaocta-methylene bis(3-methyl-5-tert-butyl-4-hydroxyhydro-cinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3-tris-( 2-methyl-4-hydroxy-5-tert-butylphenyl)butane, 1,3,5-tris-[2-(3,5-di-tert-butyl-4-hydroxyhydro-cinnamoyloxy)-ethyl]-isocyanurate, 3,5-di-(3,5-di-tert-butyl-4-hydroxybenzyl)-mesitol, hexa-methylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis[2-(3,5-tert-butyl-4-hydroxyhydrocinnamoyloxy)ethyl]-oxamide.

22. The composition of claim 21, wherein said phenolic antioxidant is selected from the group consisting of neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris-(3,5-di-tert-butyl-4-hydroxybenzyl)isocyanurate, 2,6-di-tert-butyl-p-cresol and 2,2'-ethylidene-bis(4,6-di-tert-butylphenol).

23. A method for stabilizing an organic material against oxidative, thermal and actinic degradation which comprises incorporating into said organic material an effective stabilizing amount of a compound of claim 1.

24. A compound of the formula

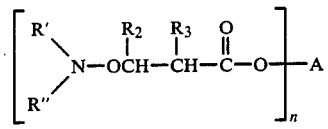

wherein p is 2 to 4;

R' and R" are independently hydrogen, alkyl of 1 to 36 carbon atoms, allyl, cycloalkyl of 5 to 12 carbon atoms, aralkyl of 7 to 9 carbon atoms or said aralkyl substituted by alkyl of 1 to 36 carbon atoms, $R_2$ and $R_3$ are independently hydrogen, alkyl of 1 to 12 carbon atoms or aryl;

A, when p=2, is an alkaline-earth metal, alkylene of 2 to 12 carbon atoms, cycloalkylene of 6 to 10 carbon atoms, arylene of 6 to 10 carbon atoms,

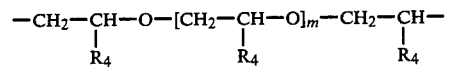

wherein m is 1 or 2 and $R_4$ is hydrogen or methyl, or

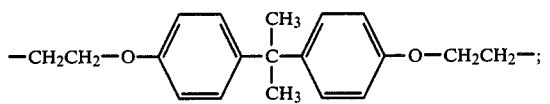

A, when p=3, is alkanetriyl of 3 to 12 carbon atoms, or said alkanetriyl of 3 to 12 carbon atoms interrupted by one or more oxygen atoms; and A, when p=4, is alkanetetrayl of 4 to 6 carbon atoms.

25. The compound of claim 24, wherein R' and R" are independently hydrogen, straight-chain or branched alkyl with 1 to 18 carbon atoms, cyclopentyl, cyclohexyl, benzyl, α-methylbenzyl or α,α-dimethylbenzyl and $R_2$ and $R_3$ are independently hydrogen or alkyl of 1 to 4 carbon atoms.

26. The compound of claim 25, wherein R' and R" are benzyl and $R_2$ and $R_3$ are hydrogen.

27. The compound of claim 24, wherein p is 2 and A is $C_2$–$C_6$ alkylene, cyclohexylene, phenylene or xylylene.

28. The compound of claim 24, wherein p is 3 and A is glyceryl or trimethylylpropane.

29. The compound of claim 24, wherein p is 4 and A is pentaerythrityl.

30. 1,6-Hexamethylene-bis[3-(N,N-dibenzylaminoxy)propanoate] according to claim 27.

31. Tetrakis[(N,N-dibenzylaminoxy)ethylcarbonyloxymethyl]methane according to claim 29.

32. 1,6-Hexamethylene bis[3-(N-allyl-N-dodecylaminoxy)propanoate] according to claim 27.

* * * * *

UNITED STATES PATENT AND TRADEMARK OFFICE
CERTIFICATE OF CORRECTION

PATENT NO. : 4,666,962

DATED : MAY 19, 1987

INVENTOR(S) : RAMANATHAN RAVICHANDRAN AND THOMAS E. SNEAD

It is certified that error appears in the above-identified patent and that said Letters Patent is hereby corrected as shown below:

Column 1, Line 45 at the end of the line, delete ")".

Column 16, Line 46 should read --

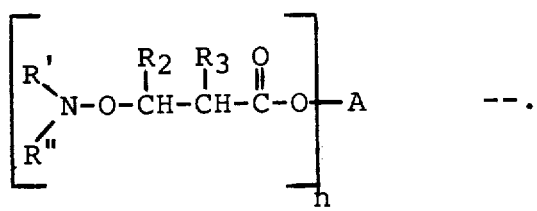  --.

Column 18, Line 45, should read -- 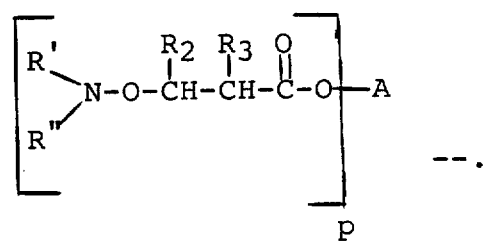  --.

Signed and Sealed this

Tenth Day of November, 1987

Attest:

DONALD J. QUIGG

Attesting Officer

Commissioner of Patents and Trademarks